(12) United States Patent
Luster et al.

(10) Patent No.: US 8,670,863 B2
(45) Date of Patent: Mar. 11, 2014

(54) GRAIN BIN FOR TEMPORARY STORAGE OF GRAIN

(75) Inventors: Jason Luster, Ramsey, IL (US); Brett D. Andricks, Moweaqua, IL (US); Robert Rasmus, Oreana, IL (US)

(73) Assignee: The GSI Group, LLC, Assumption, IL (US)

( * ) Notice: Subject to any disclaimer, the term of this patent is extended or adjusted under 35 U.S.C. 154(b) by 973 days.

(21) Appl. No.: 12/704,590

(22) Filed: Feb. 12, 2010

(65) Prior Publication Data
US 2010/0234984 A1 Sep. 16, 2010

Related U.S. Application Data

(60) Provisional application No. 61/152,364, filed on Feb. 13, 2009.

(51) Int. Cl.
*G06F 7/00* (2006.01)
*B65G 57/00* (2006.01)
*B65G 1/00* (2006.01)

(52) U.S. Cl.
USPC ........... 700/230; 700/213; 700/218; 414/287; 414/133

(58) Field of Classification Search
None
See application file for complete search history.

(56) References Cited

U.S. PATENT DOCUMENTS

| 2,288,809 A | 7/1942 | Larkin et al. | |
|---|---|---|---|
| 3,280,473 A | 10/1966 | Sullivan | |
| 3,727,656 A | 4/1973 | Luders | |
| 4,106,649 A * | 8/1978 | Nelson et al. | 414/505 |
| 4,224,770 A | 9/1980 | Petty | |
| 4,306,490 A * | 12/1981 | Kallestad et al. | 454/182 |
| 4,454,807 A | 6/1984 | Wolstenholme | |
| 4,493,248 A | 1/1985 | Wolstenholme | |
| 4,627,333 A | 12/1986 | Anderson et al. | |
| 4,660,337 A | 4/1987 | Ross, III et al. | |
| 4,726,286 A * | 2/1988 | Anderson et al. | 454/180 |
| 4,887,400 A | 12/1989 | Carroll | |
| 5,263,896 A | 11/1993 | Carroll | |
| 7,222,714 B2 | 5/2007 | Lilly | |
| 2006/0269383 A1 * | 11/2006 | Lepp et al. | 414/133 |

FOREIGN PATENT DOCUMENTS

| JP | 08-130975 A | 5/1996 |
|---|---|---|
| JP | 2001-086849 A | 4/2001 |
| KR | 20-0396026 Y1 | 9/2005 |
| KR | 10-0526308 B1 | 11/2005 |

OTHER PUBLICATIONS

International Search Report and Written Opinion corresponding to International Application No. PCT/US2010/023977, mailed Oct. 11, 2010.

* cited by examiner

*Primary Examiner* — Yolanda Cumbess
(74) *Attorney, Agent, or Firm* — Polster Lieder Woodruff & Lucchesi, L.C.

(57) ABSTRACT

A grain for the storage of grain millions of bushels of grain comprises a floor, a peripheral wall and a flexible covering. The grain bin includes an unloading system which enables the grain to be unloaded from the grain bin without the need to remove the covering and which substantially reduces the dust typically produced during unloading of currently used temporary grain bins.

26 Claims, 7 Drawing Sheets

GRAIN BIN FOR TEMPORARY STORAGE OF GRAIN

CROSS-REFERENCE TO RELATED APPLICATIONS

This application claims priority to U.S. Provisional Application No. 61/152,364 filed Feb. 13, 2009, which is entitled "Grain Bin For Temporary Storage of Grain", and which is incorporated herein by reference.

STATEMENT REGARDING FEDERALLY SPONSORED RESEARCH OR DEVELOPMENT

Not Applicable.

BACKGROUND OF THE INVENTION

This application relates to the storage of grain, and, in particular, to improvements in grain bins capable of storing millions of bushels of grain.

As is known, when grain is harvested, it is delivered to a grain elevator facility where the grain is stored in large grain bins for transfer to barges, rail cars, trucks, etc. The yield of grain, such as corn, began to increase during the 1970's. Although the grain elevator facilities commonly had the capacity to receive two to three million bushels of grain, the increased yields overflowed the capacity of the grain elevator facilities, and the facilities needed to provide temporary storage of the grain.

Such temporary storage typically comprised a wall that defined an area, for example, of about 200'×400' (61 m×122 m). Typically, the wall comprised an upper generally vertical portion and a lower inwardly sloping portion. The grain was delivered as far into the center of the area defined by the wall to maximize the amount of grain that could be contained within the perimeter of the wall. Once the area was filled with grain, the grain pile was covered with a tarp. Because the grain was contained in one large pile, the grain could not be easily transferred to rail cars, barges, etc.

Delivery of the grain from the grain pile to transportation equipment (i.e., barges, rail cars, etc.) required that the grain first be loaded into the grain elevator bins. This is generally accomplished by means of bucket loaders, front end loaders, etc. which deliver the grain from the grain pile to bin loading equipment. From the bin loading equipment, the grain can then be transferred to the transportation equipment. Hence, the grain stored in the temporary storage must be handled twice. Further, the loading and unloading of the grain from the temporary storage generates a significant amount of dust.

When it is time to transfer the grain from the grain pile, the tarp is removed from the pile. Removal of the tarp typically damages the tarp, and hence, the tarp is commonly disposed of. Once the tarp is removed, the grain is exposed and must be moved as quickly as possible to the grain elevator grain bins to maintain the condition of the grain as best as possible. However, if it should rain while the tarp is removed, the grain may need to be reconditioned.

Aeration of the grain within the grain pile is important to maintain the condition of the grain. Typically, blowers are provided either above the pile (at the top of a loading tube) or around the wall. These blowers are operated to draw air through the grail pile, and hence also function to hold the tarp down on the grain pile. Typically, a significant amount of dust is withdrawn from the pile and is expelled by the blowers.

BRIEF SUMMARY OF THE INVENTION

The storage system described below addresses many of the issues presented above. Briefly, a grain for the storage of grain millions of bushels of grain comprises a floor, a peripheral wall and a flexible covering. The grain bin includes an unloading system which enables the grain to be unloaded from the grain bin without the need to remove the covering and which substantially reduces the dust typically produced during unloading of currently used temporary grain bins.

BRIEF DESCRIPTION OF THE SEVERAL VIEWS OF THE DRAWINGS

FIG. 4C being taken along line C-C of FIG. 4B;

Corresponding reference numerals will be used throughout the several figures of the drawings.

DETAILED DESCRIPTION OF THE INVENTION

Figure 1:
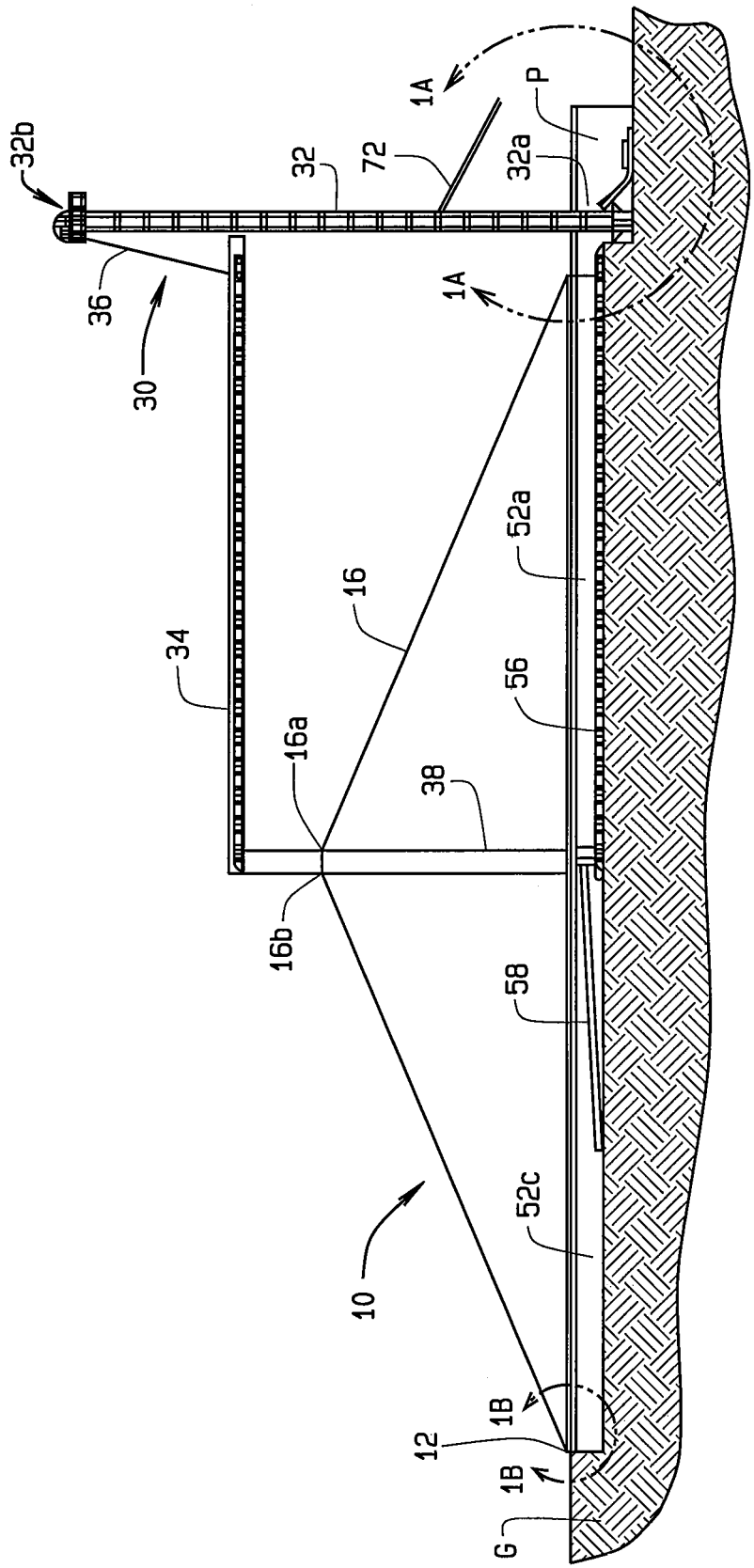
FIG. 1 is a side elevational view of a storage bin made in accordance with the claims.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what we presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 1B:
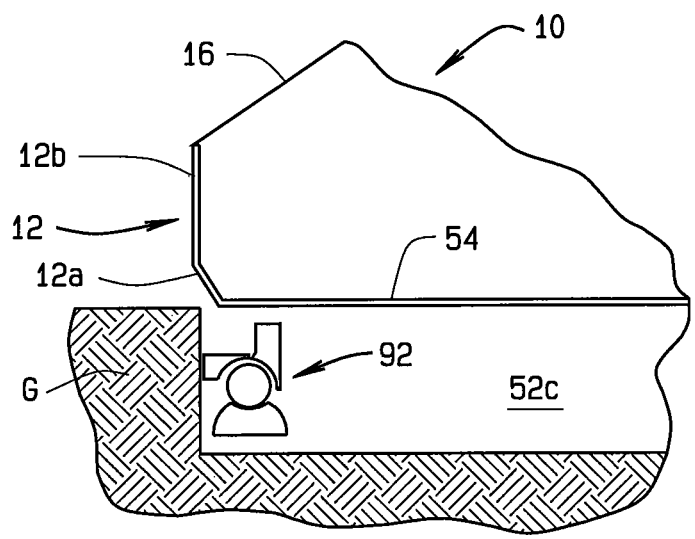
FIG. 1B is an enlarged fragmentary view taken along circle B-B of FIG. 1 showing a blower in a channel of the bin for aeration of grain stored in the bin.
Figure 2:
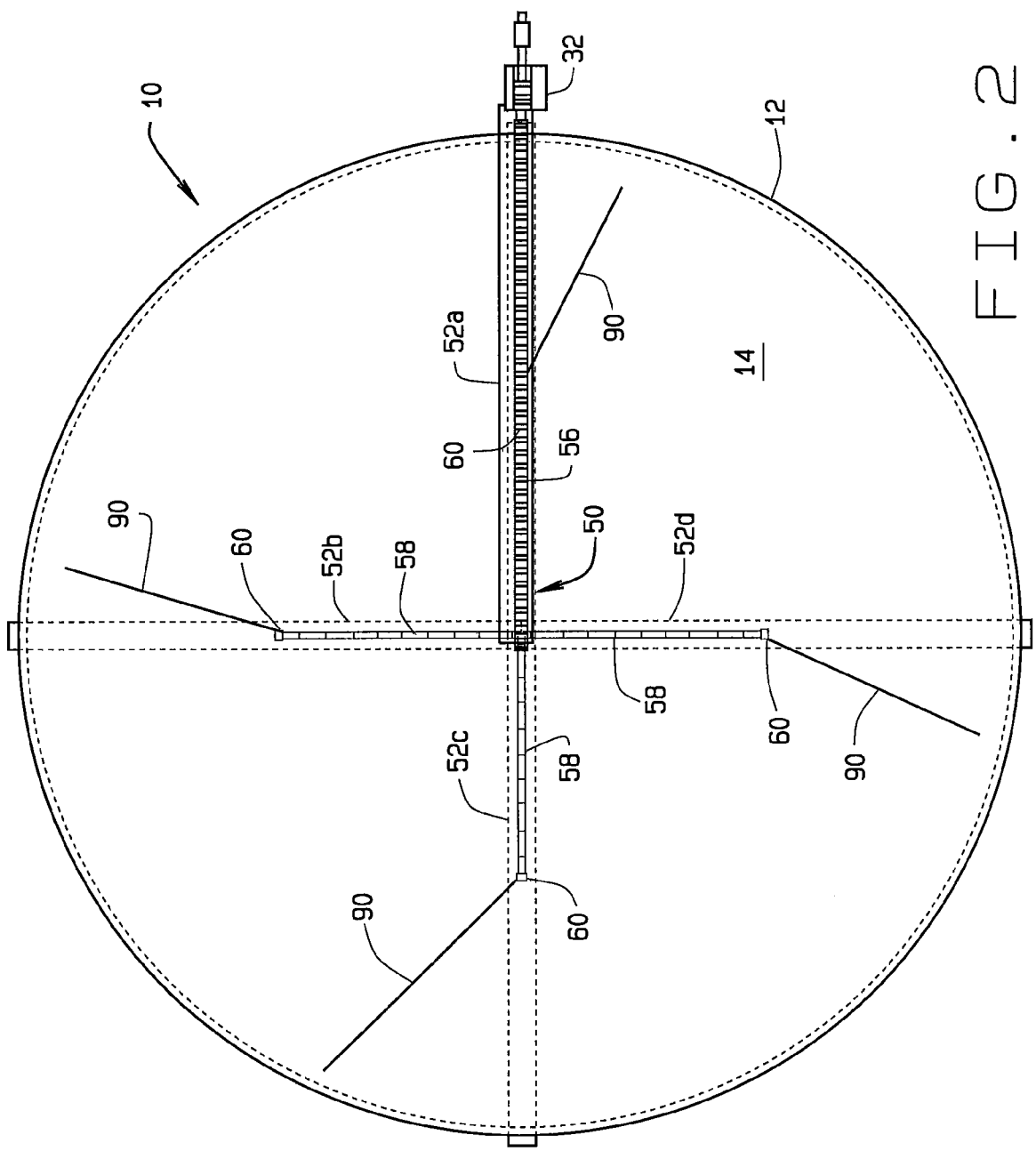
FIG. 2 is a top plan view of the bin, but with the tarp or covering removed to more clearly show the inside of the bin.

Referring initially to FIGS. 1-2, a grain bin 10 comprises a side wall 12 surrounding a floor 14. The floor 14 is formed on the ground G. Illustratively, the floor and wall are generally circular to define a circle having a diameter of about 400' (about 120 m). The wall illustratively is 6' (~2 m) tall. The wall can comprise a bottom inwardly sloping section 12a (FIG. 1B) and an upper generally vertical section 12b. The wall upper section 12b can, for example, be made from corrugated sheet metal. Alternatively, the wall 12 can be vertical, i.e., it could be made without the bottom sloping section 12a. The floor can be made from cement, crushed gravel, or any other material which provides a proper flooring for grain. A cover 16, such as a tarp, is secured to the top of the wall 12, and extends inwardly and upwardly from the top of the wall 12 to an apex 16a. Preferably, the cover 16 is flexible. The tarp cover 16 can, for example, be made from plastic sheeting, canvas, or other flexible materials. Preferably, the tarp material will be impervious to fluids (i.e., rain, snow, etc.) to protect the grain contained in the bin from the weather. The tarp 16, defines a truncated cone when the bin is filled (as seen in FIG. 1). The truncated top of the tarp is defines an opening 16b into the bin area. Illustratively, the tarp defines an incline of about 23°, which corresponds to the angle of repose of a pile of corn. If other grain is to be stored in the bin, the tarp can be configured to define an angle corresponding to the angle of repose of the grain contained within the bin 10. With the noted dimensions, the apex 16a of the tarp 16 is about 87.75° (~26.75 m) above ground level (i.e. above the floor 14). It will be appreciated that grain bins of this size are not delivered in an assembled state. Rather, the components of the grain bin are delivered to the site and the grain bin is constructed at the site.

The bin 10 is provided with a loading system 30 to deliver grain into the bin. The loading system includes a bucket elevator 32 located outside of the bin wall 12. The bucket elevator has a lower portion 32a which is positioned in an upwardly opening pit P in the ground G. Hence, the lower portion 32a is below the surface of the ground (and thus is below the bin floor 14). The bucket elevator extends vertically upwardly from the pit P and has an upper end 32b which is above the apex of the tarp 16. A loading system 33 is positioned in the pit P. The loading system 33 receives grain from a transport (i.e., railcar, trailer, barge, etc) and delivers the grain to the bucket elevator 32. A delivery conveyor 34 (shown in FIG. 1 to be generally horizontal) receives grain from the bucket elevator 32 by means of a delivery pipe 36. The delivery conveyor 34 delivers the grain to a centrally positioned drop tube 38 which extends generally vertically through the tarp opening 16b to the bin floor 14. The drop tube is perforated along at least the portion of the drop tube that is below the tarp so that the grain can exit the drop tube along the length of the drop tube. This loading system 30 allows for the grain to be deposited within the bin without the need to remove the tarp from the bin wall 12. Additionally, the perforated drop tube 38 allows for the grain to fill the bin 10 to its natural angle of repose.

The tarp 16 is secured to the drop tube 38 at its apex 16a by means of cables (which can be comprised of chains, ropes, cords, etc.) (not shown). The cables are connected to a winch system (not shown) to facilitate raising of the tarp 16 during loading, as is known, and to lower the tarp during unloading of the grain from the bin. The ability to raise and lower the tarp allows for the tarp to remain close to the grain, to limit the air gap between the grain pile in the bin 10 and the tarp 16. The tarp 16 is secured at its periphery to the top of the wall 12 by any conventional means.

The bin 10 is also provided with an unloading system 50 which enables the bin to be unloaded from beneath the tarp 16. Thus, unlike conventional temporary storage bins, the tarp 16 does not need to be removed from the bin to unload grain from the bin. Further, as will be described in more detail below, the unloading system 50 allows for delivery of the grain from within the bin directly to transportation equipment (i.e., train cars, boats, barges, trailers, etc.).

With reference to FIGS. 2-6, the bin includes a plurality of channels 52a-d in the floor 14 which radiate out from the center of the floor and extend to at least to the wall 12. Four channels are shown, however more (or fewer) could be provided, as desired. The channels are preferably equally spaced apart. Thus, with the four channels 52a-d, two adjacent channels define angles of 90°. Illustratively, the channel 52a (which extends to the pit P) can be 10' deep by 10' wide and the channels 52b-d can be 10' deep by 8' wide. The channels 52a-d are each covered along their length with perforated panels or flooring 54. Illustratively, the panels 54 span the width of the channels, and a sufficient number of panels are placed across the channels to cover the channels. The perforations in the panels are sufficiently small so as to prevent grain from passing through the perforations. The perforations do, however, allow for air to pass through the panels 54 into the channels 52a-d.

An unloading conveyor 56 is positioned in channel 52a and extends from the center of the floor to the bucket elevator 32. The conveyor 56 lies flat along the bottom of the channel 52a and delivers grain outwardly to the bucket elevator 32. Feeding conveyors 58 are received in each of the channels 52b-d. As will be explained below, feeding conveyors 58 operate to move grain radially inwardly, to deliver the grain to the unloading conveyor 56. The feeding conveyors 58, as illustratively shown, only extend about one-half the length of the channels 52b-d. As seen in FIG. 1, the outer ends of the feeding conveyors 58 rests on the bottom of the channels 52b-d, and the conveyors 58 slope upwardly to the center point, where the inner end of the feeding conveyors 58 are above the unloading conveyor 56.

Figure 3:
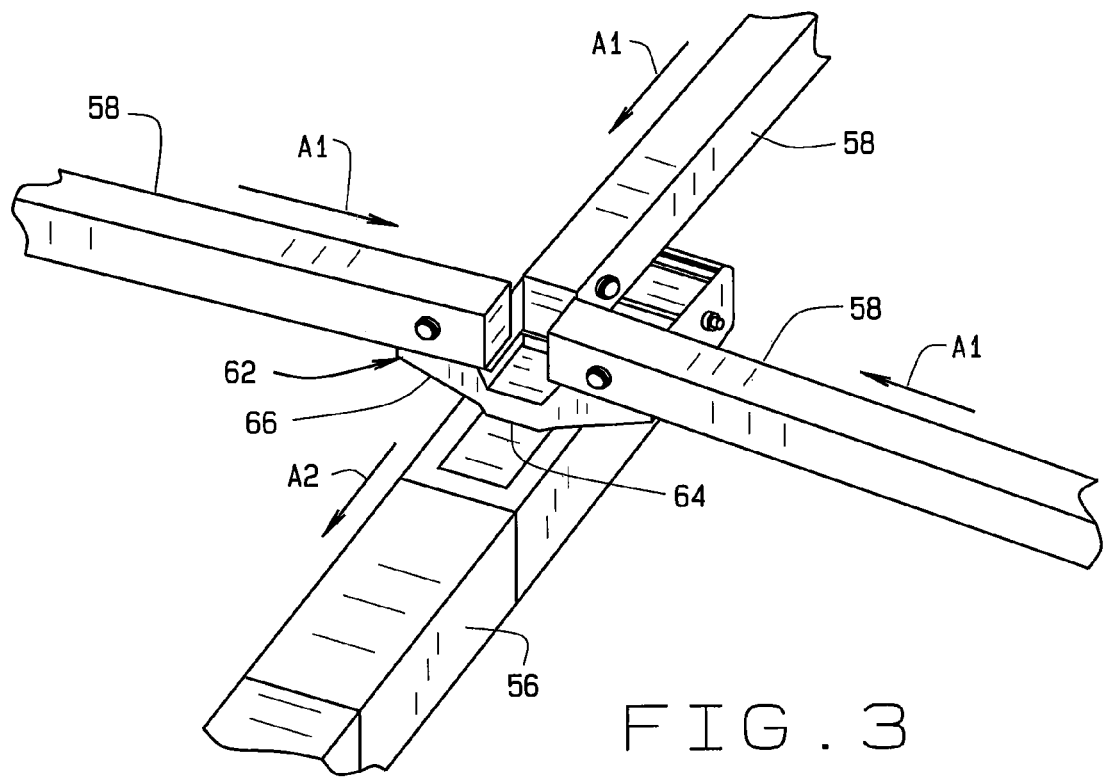
FIG. 3 is a fragmentary perspective view of an unloading system for the bin.
Figure 6A:
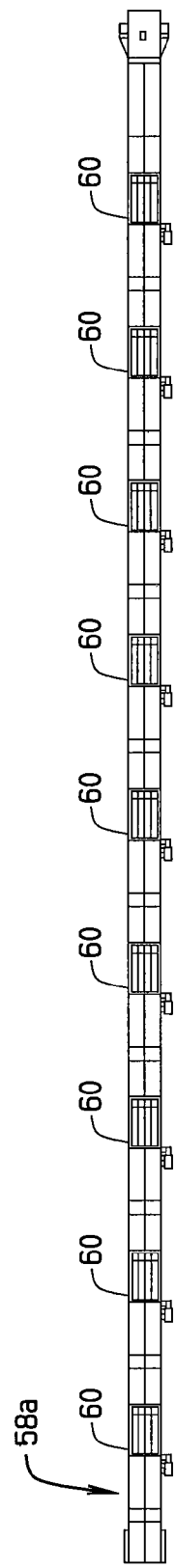
FIG. 6A is a top plan view of gates positioned above a conveyor of the unloading system to allow grain to fall through into the unloading system.
Figure 7:
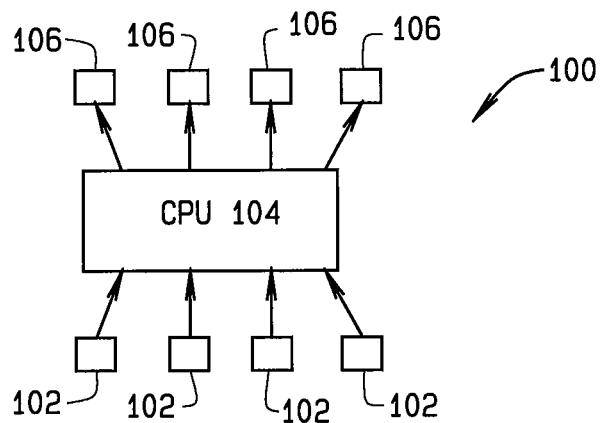
FIG. 7 is a block diagram of a control system for the unloading system.

The conveyors 56 and 58 are shown in FIG. 3 in more detail. The conveyors 56 and 58 are all closed conveyors. As is common, the conveyors 56 and 58 contain elements, such as a moving belt, screw, paddles, etc. which will move grain through the conveyor. The moving elements are controlled by a motor 106 (FIG. 7). Ports or gates 60 (described below) are positioned in the channels 52a-d above the conveyors 56 and 58. Preferably, as seen in FIG. 6A, a plurality of gates 60 are placed in the flooring above each channel. That is, the gates define part of the flooring above the channels. The gates 60 are preferably spaced along the channels. For example, the gates can be spaced apart about 10' (~3 m) on centers. This provides for multiple points for the grain to enter the conveyors along the length of the conveyors. Grain passes from the grain pile into the bin through the gates 60 and into the conveyors 56 and 58. The conveyors 58 carry the grain radially inwardly toward the center of the bin, in the direction of the arrows A1 (FIG. 3). The grain carried inwardly by the conveyors 58 is received by the conveyor 56, and the conveyor 56 carries the grain from the center of the bin outwardly to the bucket elevator 32 in the direction of the arrow A2. In addition, the conveyor 56 receives grain directly from the grain pile through gates 60 above the conveyor 56.

Figure 4A:
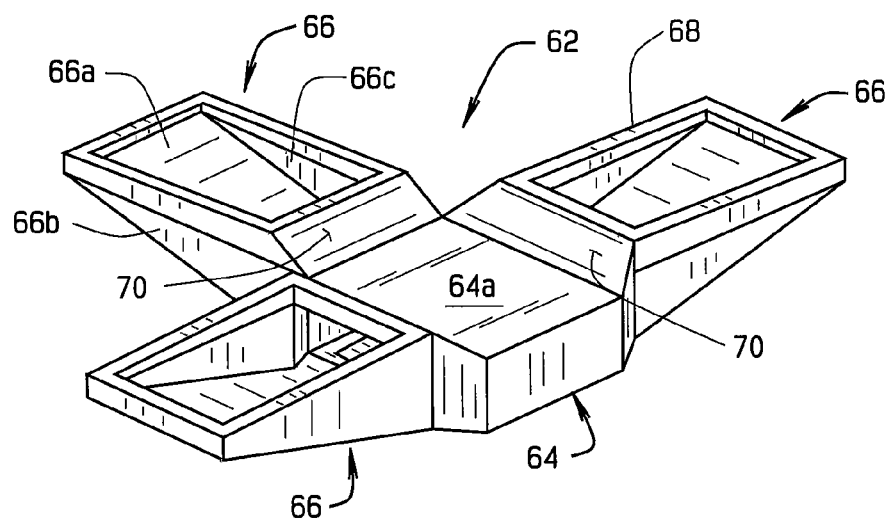
FIGS. 4A-C are perspective, top plan, and cross-sectional views, respectively, of a junction box for the unloading system.
Figure 4B:
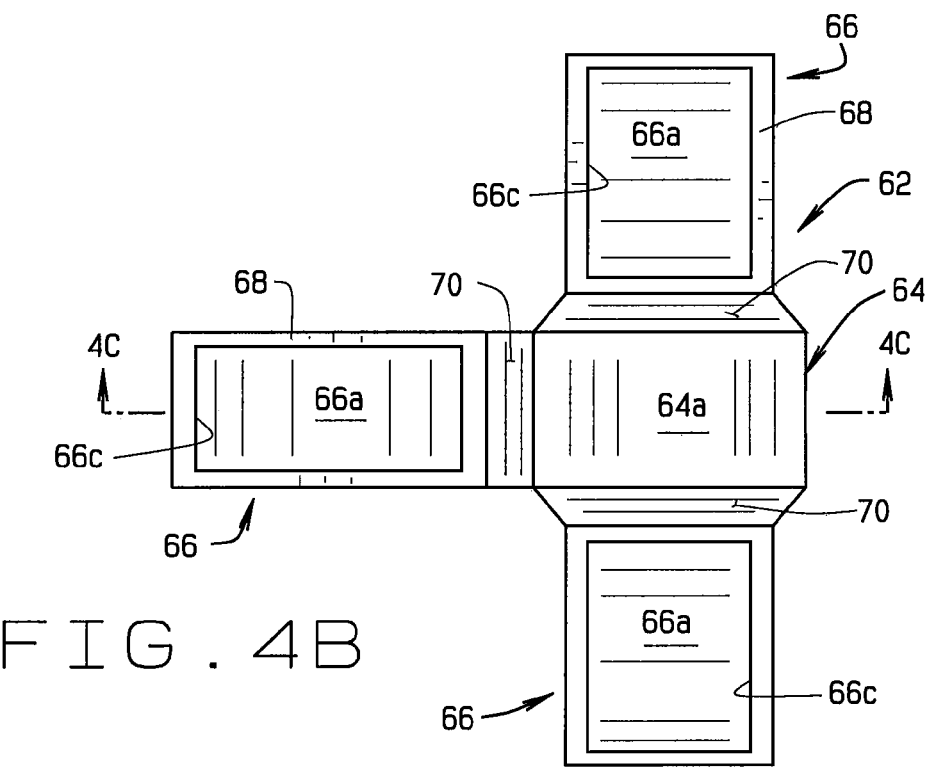
Figure 4C:
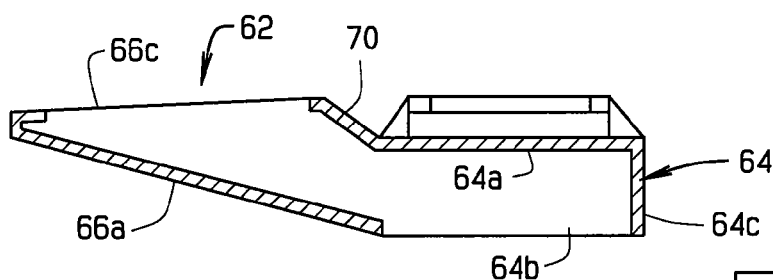
Figure 4D:
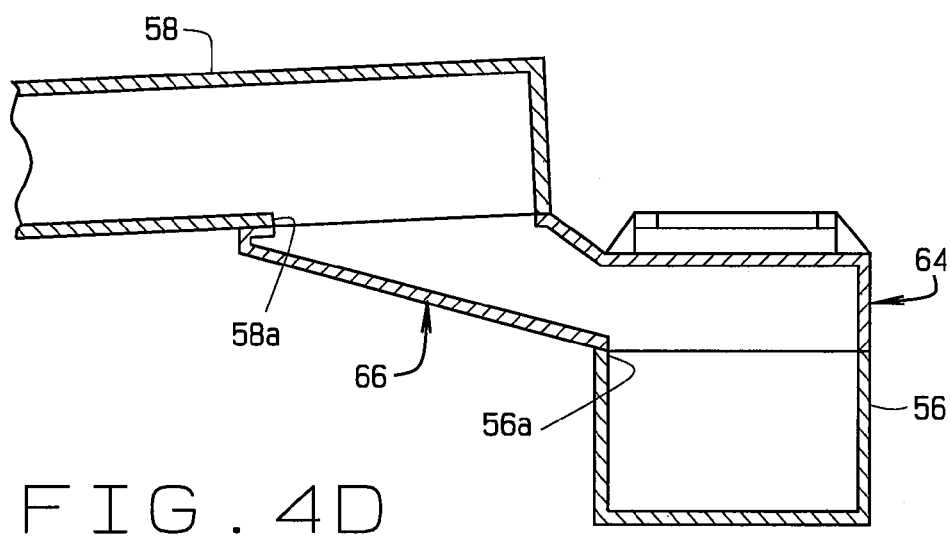
FIG. 4d is a cross-sectional view of the junction box and two conveyors of the unloading system.
Figure 5:
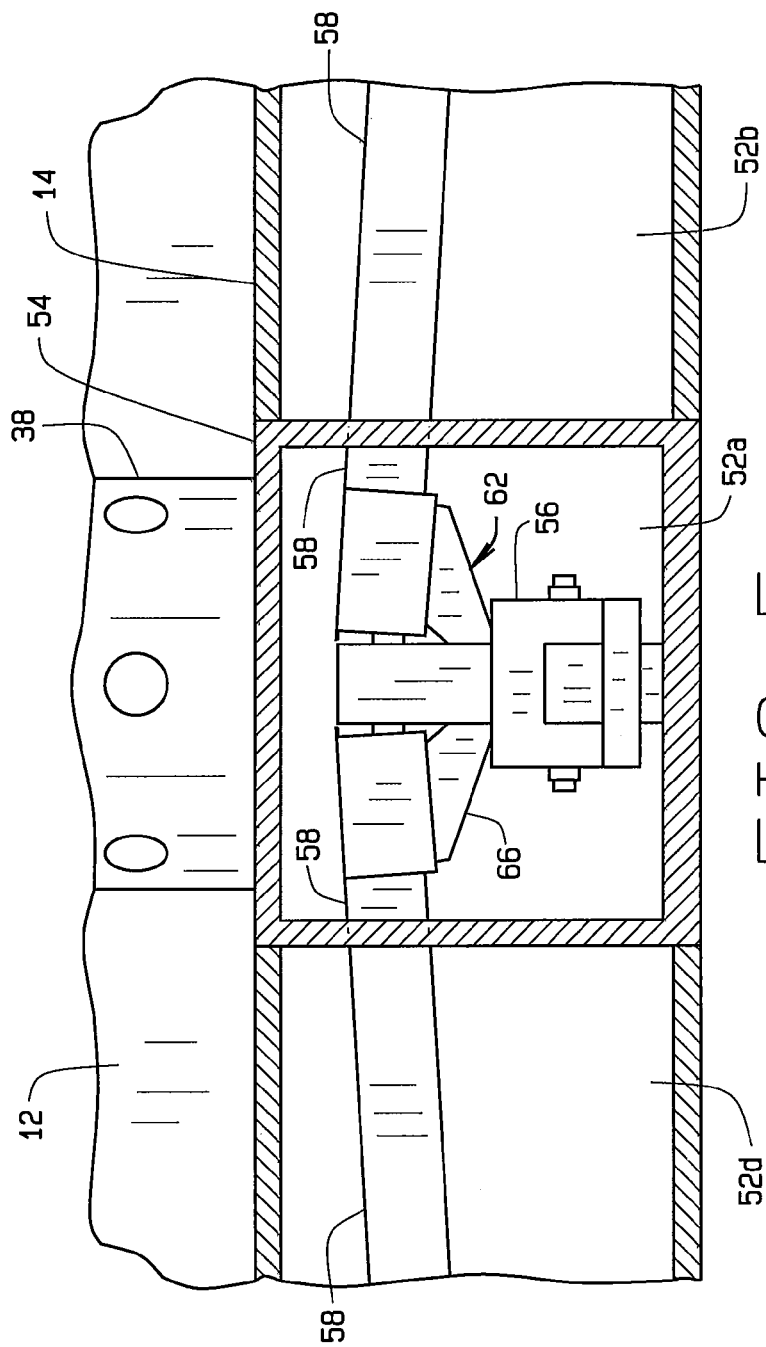
FIG. 5 is a sectional view showing a the central point of the unloading system in underground channels beneath a floor of the bin.

A junction 62 (FIGS. 4A-C) is provided to place the conveyors 58 in communication with the conveyor 56. The junction 62 includes a central body 64 having a top 64a and an open bottom 64b. The body 64 is closed on one side and on its top. Funnels 66 are shown to extend from three sides of the body. The funnels 66 are each defined by a sloping bottom wall 66a, opposed side walls 66b and are open at their tops 66c. A rim 68 surrounds the open top to define an opening into the funnel. The rim 68 is above the level of the body top surface 64a, and hence, a sloping wall 70 extends from the rear of the rim toward a top edge of the body top surface 64a. As best seen in FIGS. 3, 4d and 5, the conveyors 58 are mounted to the funnel 62, and have exits 58a which overly the open top of the funnels 66. The junction body 64 is positioned above an inlet 56a to the unloading conveyor 56. Thus, the junction 62 places the conveyors 58 in communication with the conveyor 56, such that the conveyors 58 will deliver grain to the conveyor 58, and the conveyor 58 will deliver the grain out of the grain bin, as discussed more fully below. The junction box body is shown to be generally rectangular, with funnels 66 connected to three sides of the body. The body could be formed in other configurations (such as triangular, pentagonal, hexagonal, etc.) to provide for more or fewer funnels and thus more or fewer feeder conveyors 58, as may be desired.

As is clear, the conveyor 56 receives grain from the conveyors 58. Additionally, the conveyor 56 receives grain through its own inlet ports 60. Thus, as can be appreciated, the conveyor 56 has to be able to handle significantly more grain than do the conveyors 58. To this end, as can be seen in FIG. 3, the channel conveyor 56 is larger than the conveyors 58. Similarly, as noted above, the channel 52a (which houses the conveyor 56) is larger than the channels 52b-d (which house the conveyors 58.

Figure 1A:
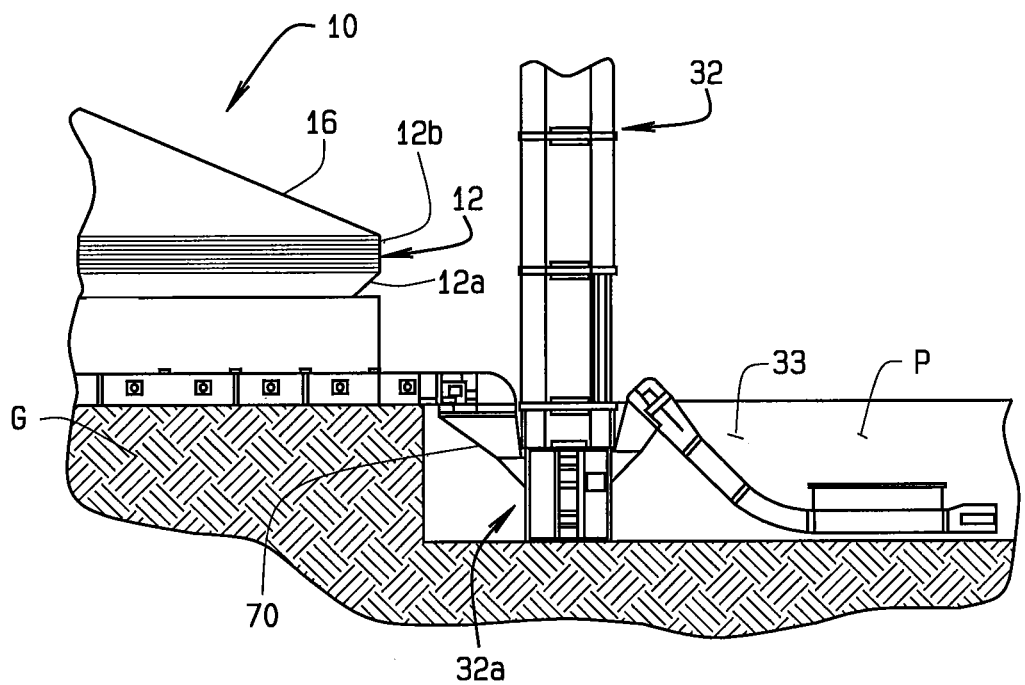
FIG. 1A is an enlarged sectional, fragmentary view of the storage bin taken at the circle A-A of FIG. 1 and showing the communication between the unloading system and a bucket elevator.

Turning to FIG. 1A, the unloading conveyor 56 delivers the grain to the bucket elevator 32, which as noted above, is outside the bin wall 12. The bucket elevator 32 includes a grain receiving port 70 into which the conveyor 56 deposits grain. The grain receiving port is in the lower portion 32a of the bucket elevator in the pit P adjacent the bin 10. The bucket elevator 32 carriers the grain up and out of the pit P. An unloading tube 72 (FIG. 1) is provided to receive the grain to be unloaded from the bin, and to deliver the grain to transportation equipment (trailers, train cars, barges, ships, etc.).

Figure 6B:
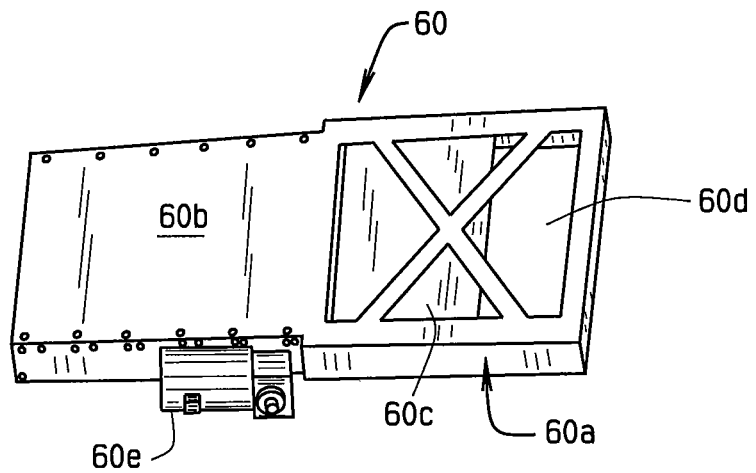
FIGS. 6B and C are top and bottom perspective views of a gate.
Figure 6C:
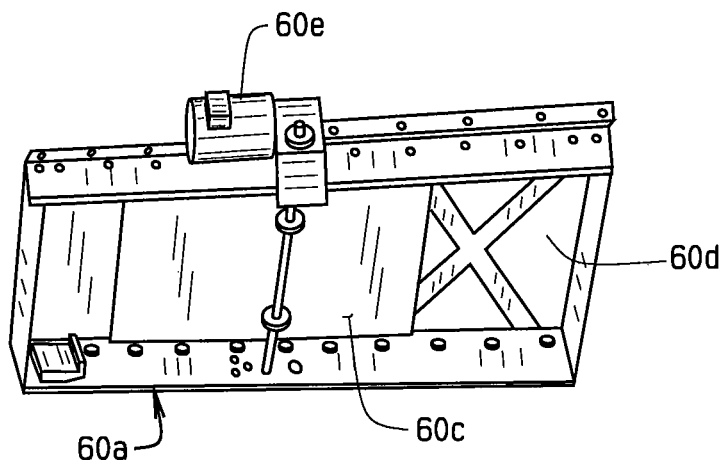

Turning to FIGS. 6B-C, the gates 60 are preferably the substantially similar to the gates disclosed in U.S. Pat. No. 7,222,714, which is incorporated herein by reference. Briefly, each gate 60 comprises a frame 60a having front, back and side members, a top surface 60b which is shorter than the length of the frame, and a sliding plate 60c. The top surface, in combination with the frame, defines an aperture 60d through which grain can flow. The sliding plate is movable by means of a motor 60e between a position in which the plate is fully retracted beneath the aperture 60d (such that the aperture is fully opened) and a position in which the sliding plate 60d is in a forward most position (such that the aperture is fully closed). To facilitate controlling the rate of flow of grain through the gates 60, the size of the aperture 60d can be increased or decreased by controlling the motor 60e. Although not shown, a chute is provided between each gate 60 and the respective conveyor below the gate. The chute connects to the conveyor at an opening to the conveyor. Hence, the grain will flow through the gate aperture 60d, through the chute and into the conveyor below the gate. Alternatively, the conveyors could be opened along the length of the tops of the conveyors, thereby eliminating the need for discrete openings into the conveyor.

As the grain passes through the ports 60 into the conveyors 56 and 58, the level of the grain will drop, and conical recesses will ultimately form in the grain pile. It is desirable that the level of the grain pile reduces in a generally even manner. To this end, the rate of entry of grain into the conveyors is controlled by means of a control system 100 (FIG. 7), so that the rate of entry of grain at each port is substantially equal. The control system 100 includes a flow meter 102 at each port 60 to determine the rate at which grain enters each of the conveyors. The flow meters 102 transmit a signal indicative of the rate of grain flow to a CPU or processor 104. The processor 104, in turn, utilizes the signal from the meters 102 to control the speed of the conveyors and/or the size of the aperture 82 of the ports 86. To this end, the CPU is in communication with the motors 106 of the conveyors, and the CPU can increase or decrease the speed of the conveyors, as it deems necessary to control the rate of grain entering the conveyors. Additionally, the CPU 104 is in communication with the motor 60e of each gate 60. The CPU can control the gate 60 to increase or decrease the size of their respective apertures 60d, as deemed necessary, to maintain an equal flow rate of grain through each port 60.

As is known, not all the grain will flow into the unloading system under the force of gravity. Rather, without mechanical assistance, the grain would flow under gravity into the unloading system until piles of grain were left that had an angle of repose for the grain to be unloaded. At that time, grain would cease to enter the unloading system under the force of gravity. To this end, the grain bin unloading system can be provided with at least one bin sweep 90 (FIG. 2) located along the path of each channel 52a-d. As shown in FIG. 2, the bin sweeps 90 are located approximately mid-way along the length of each channel, such that the sweeps 90 are located proximate the ends of the feeding conveyors 58 and approximately at the mid-point of the unloading conveyor 56. Although a single bin sweep 90 is shown in conjunction with each channel 52a-d (and hence in conjunction with each conveyor), in view of the length of the channels, additional bin sweeps can be positioned along the length of the channels. Further, additional bin sweeps can be located in a spaced relationship from the channels. These additional bin sweeps would be positioned to sweep grain into the path of the first-noted bin sweeps, such that the first noted bin sweeps could then sweep the grain in to the unloading system. Alternatively, the bin could be provided with one single bin sweep which would extend from the center of the bin to the edge of the bin, and which would direct grain to the gates 60 as the sweep rotated about the bin.

Lastly, the bin 10 includes an aeration system to maintain a flow of air through the grain to maintain the condition of the grain. To this end, blowers 92 (FIG. 1B) are provided at the ends of the channels 52b-d. The blowers 92 direct air outwardly, away from the bin. Thus, air is pulled into the bin from the top of the bin, through the grain pile beneath the tarp, through the perforated floor panels and into the channels 52b-d.

As can be appreciated from the above description, the grain bin 10 and its associated loading system 30 and unloading system 50 are too large to be delivered in an assembled condition. Hence, the components of the bin and the loading and unloading system are delivered to the site, and the bin is constructed on site. The various elements that will be delivered include the wall segments to construct the bin wall; the tarp, conveyor sections to construct the conveyors 56, 58, perforated flooring plates 54, gates 60, blowers 92, sections for the feed tube 38 and delivery conveyor 34, components for the bucket elevator 32 and the various gravity dependent feed tubes 36 and 72.

As various changes could be made in the above constructions without departing from the scope of the claimed invention, it is intended that all matter contained in the above description or shown in the accompanying drawings shall be interpreted as illustrative and not in a limiting sense.

The invention claimed is:
1. A grain bin unloading system comprising:
  an unloading conveyer extending to a grain delivery device; said unloading conveyor comprising an inlet and an outlet; and
  at least one feeding conveyor; said at least one feeding conveyor comprising an outlet port at one end and an inlet port spaced from said outlet; said feeding conveyor outlet port being in communication with the inlet of the unloading conveyor to deliver grain from the at least one feeding conveyor to the unloading conveyor;

said at least one inlet port being in communication with a bin space to receive grain from a grain pile in the bin space; said at least one inlet port comprising an aperture through which grain can flow from the bin space into the at least one feeding conveyor.

2. The grain bin unloading system of claim 1 wherein said unloading conveyor comprises a unloading port positioned between said inlet and outlet; said port for said unloading conveyor being configured to receive grain from a grain pile; said at least one unloading port comprising an aperture through which grain can flow from a bin space into the at least one feeding conveyor.

3. The grain bin unloading system of claim 1 wherein said unloading conveyor extends at least to a bin wall.

4. The grain bin unloading system of claim 3 wherein said at least one feeder conveyor extends from said inlet of said unloading conveyor towards said bin wall.

5. The grain bin unloading system of claim 4 wherein said at least one feeder conveyor does not extend to said bin wall.

6. The grain bin unloading system of claim 1 including a junction box between said at least one feeding conveyor and said unloading conveyor; said junction box comprising a body having an open bottom and at least one funnel; said funnel opening upwardly; said body bottom being positioned over said inlet to said unloading conveyor and said feeder conveyor outlet being positioned over said funnel; whereby grain flows from said feeder conveyor outlet, through said funnel and said junction body into said unloading conveyor inlet.

7. The grain bin unloading system of claim 1 including a controller for controlling the rate of flow of grain delivered from the at least one feeding conveyor to the unloading conveyor; said controller including a flow meter at each inlet port; said flow meter emitting a signal indicative of the rate of flow of grain through the inlet port; said controller adjusting the rate of delivery of grain into the unloading conveyer, such that the rate of grain entry into the unloading conveyor and at least one feeding conveyor is substantially equal.

8. The grain bin unloading system of claim 7 wherein the controller controls the speed of the conveyors.

9. The grain bin unloading system of claim 7 wherein the inlet ports each include an aperture through which the grain flows; the aperture being adjustable to alter the effective size of the aperture; the controller controlling the size of the inlet port apertures.

10. The grain bin unloading system of claim 9 wherein each said inlet port comprises an opening and a gate which is slidable relative to said opening; said gate being selectively movable between a closed position and an open position to selectively adjust the size of the aperture; said controller controlling the position of said gate relative to said inlet port opening to control the size of the aperture.

11. The grain bin unloading system of claim 1, wherein the grain delivery device comprises a grain elevator; said unloading conveyor being in communication with said grain elevator to deliver grain to the grain elevator.

12. The grain bin unloading system of claim 11 wherein said grain elevator is positioned outside a grain bin wall.

13. A grain bin for the storage of grain; said grain bin comprising:

a floor; a circumferential wall; and a covering; said floor, circumferential wall and covering defining a bin space; and a grain unloading system positioned beneath said floor; said unloading system comprising:

an unloading conveyer; the unloading conveyor extending from an interior point of the grain bin to a grain delivery device; said unloading conveyor comprising an inlet and an outlet;

at least one feeding conveyor; said at least one feeding conveyor comprising an outlet at one end; said outlet being in communication with the inlet of the unloading conveyor to deliver grain to the unloading conveyor; and at least one feeding conveyor port in at least said at least one feeding conveyor; said at least one feeding conveyor port being in communication with said bin space to receive grain from a grain pile in the bin space; said at least one feeding conveyor port comprising an aperture through which grain can flow from the bin space into the conveyor.

14. The grain bin of claim 13 wherein said unloading conveyor comprises a port positioned between said inlet and outlet; said port for said unloading conveyor being in communication with said bin space to receive grain from a grain pile in the bin space; said at least one port comprising an aperture through which grain can flow from the bin space into the at least one feeding conveyor.

15. The grain bin of claim 13 wherein said unloading conveyor and said at least one feeder conveyor extend outwardly from a center of said bin; at least said unloading conveyor extending from said center of said bin at least to said bin wall.

16. The grain bin of claim 15 wherein said feeder conveyor does not extend to said bin wall.

17. The grain bin of claim 13 wherein said grain bin floor overlies a ground surface; said grain bin including channels in the ground; said conveyors being positioned in said channels.

18. The grain bin of claim 17 wherein said channels are upwardly opening channels and are in communication with said grain bin space; said channels being covered with perforated flooring.

19. The grain bin of claim 18 wherein said perforated flooring includes perforations sized to prevent grain from passing through the perforated flooring.

20. The grain bin of claim 18 wherein said channels extend to at least said grain bin wall; said grain bin further including a blower positioned in at least one of said channels; said blowers being operable to draw air from said grain bin space, through said perforated flooring and said channels to aerate grain received in said grain bin.

21. The grain bin of claim 20 wherein said blower is positioned in a channel in which said at least one feeder conveyor is positioned; said channel having a length greater than said feeder conveyor.

22. The grain bin of claim 13 including a controller to control the rate of flow of grain passing into said unloading system; said controller comprising a CPU, at least one flow meter in electronic communication with said controller, and at least one of said aperture and said conveyors; said flow meter being positioned proximate said aperture and generating a signal indicative of the rate of flow of grain into the conveyor; said CPU controlling said at least one of said aperture and said conveyors in response to the signal received from said at least one flow meter.

23. The grain bin of claim 22 wherein said aperture comprising a gate having a variable sized opening; said gate being in communication with said CPU whereby said CPU can control the size of said opening in response to the signal from said at least one flow meter.

24. The grain bin of claim 22 wherein said conveyor is operatively connected to said CPU; said CPU controlling the speed of said conveyor in response to the signal from said at least one flow meter.

25. A grain bin for the storage of grain; said grain bin assembled at the site and comprising:
- flooring material to form a floor of said grain bin; wall members which when assembled define a peripheral wall; a covering adapted to be secured to said wall members; whereby said floor, peripheral wall and covering defining a bin space; and
- a grain unloading system positionable beneath said floor; said unloading system comprising:
  - unloading conveyer members adapted to be assembled into an unloading conveyor; the unloading conveyor extending from an interior point of the grain bin to a point outside of the grain bin wall; said unloading conveyor comprising an unloading conveyor inlet at a first end, an unloading conveyor outlet at an second end opposite said first end, and a unloading conveyor port spaced between said first and second ends;
  - feeding conveyor members adapted to be assembled into at least one feeding conveyor; said at least one feeding conveyor comprising an feeding conveyor outlet at one end and a feeding conveyor port spaced from said outlet; said outlet being in communication with the unloading conveyor inlet to deliver grain to the unloading conveyor; and
  - said ports for each conveyor being in communication with said bin space to receive grain from a grain pile in the bin space; said ports each comprising an aperture through which grain can flow from the bin space into the conveyor.

26. A grain bin unloading system, comprising:
- an unloading conveyer extending to a grain delivery device; said unloading conveyor comprising an inlet and an outlet; and
- at least one feeding conveyor; said at least one feeding conveyor comprising an outlet port at one end and an inlet port spaced from said outlet; said feeding conveyor outlet port being in communication with the inlet of the unloading conveyor to deliver grain from the at least one feeding conveyor to the unloading conveyor;
- said at least one inlet port being in communication with said bin space to receive grain from a grain pile in the bin space; said at least one inlet port comprising an aperture through which grain can flow from the bin space into the at least one feeding conveyor; and
- a junction box between said at least one feeding conveyor and said unloading conveyor; said junction box comprising a body having an open bottom and at least one funnel; said funnel opening upwardly; said body bottom being positioned over said inlet to said unloading conveyor and said feeder conveyor outlet being positioned over said funnel; whereby grain flows from said feeder conveyor outlet, through said funnel and said junction body into said unloading conveyor inlet.

* * * * *